(12) United States Patent
Giuliano

(10) Patent No.: US 11,967,897 B2
(45) Date of Patent: Apr. 23, 2024

(54) SUPPRESSION OF REBALANCING CURRENTS IN A SWITCHED-CAPACITOR NETWORK

(71) Applicant: pSemi Corporation, San Diego, CA (US)

(72) Inventor: David M. Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/754,324

(22) PCT Filed: Sep. 29, 2020

(86) PCT No.: PCT/US2020/053336
§ 371 (c)(1),
(2) Date: Mar. 30, 2022

(87) PCT Pub. No.: WO2021/067311
PCT Pub. Date: Apr. 8, 2021

(65) Prior Publication Data
US 2022/0393584 A1 Dec. 8, 2022

Related U.S. Application Data

(63) Continuation of application No. 16/588,060, filed on Sep. 30, 2019, now Pat. No. 10,924,006.

(51) Int. Cl.
*H02M 3/07* (2006.01)
(52) U.S. Cl.
CPC .................. *H02M 3/073* (2013.01)

(58) Field of Classification Search
None
See application file for complete search history.

(56) References Cited

U.S. PATENT DOCUMENTS

| | | | |
|---|---|---|---|
| 8,159,091 B2 | 4/2012 | Yeates | |
| 9,841,805 B2 * | 12/2017 | Shimada | G06F 1/324 |
| 9,887,622 B2 * | 2/2018 | Low | H02M 3/07 |
| 9,997,999 B2 * | 6/2018 | Petersen | H02M 1/15 |
| 10,128,745 B2 | 11/2018 | Low | |
| 10,141,849 B1 * | 11/2018 | Jiang | H02M 3/285 |
| 10,193,441 B2 | 1/2019 | Giuliano | |
| 10,374,511 B2 * | 8/2019 | Salem | H02M 3/07 |
| 10,972,004 B2 * | 4/2021 | Lenhard | H02M 3/07 |
| 11,515,793 B2 * | 11/2022 | Cannillo | H02M 3/1584 |
| 2009/0278520 A1 | 11/2009 | Perreault | |
| 2010/0181973 A1 * | 7/2010 | Pauritsch | H02M 3/07 323/280 |
| 2013/0229841 A1 | 9/2013 | Giuliano | |
| 2019/0081561 A1 | 3/2019 | Low | |
| 2019/0229615 A1 | 7/2019 | Sanders | |

(Continued)

FOREIGN PATENT DOCUMENTS

| | | |
|---|---|---|
| CN | 103038990 B | 6/2016 |
| KR | 10-2011-0136964 A | 12/2011 |
| WO | 2017/161368 A1 | 9/2017 |

*Primary Examiner* — Thomas J. Hiltunen
(74) *Attorney, Agent, or Firm* — Finnegan, Henderson, Farabow Garrett & Dunner LLP

(57) ABSTRACT

A power converter includes a switched-capacitor circuit that forms different capacitor networks out of a set of capacitors. It does so in a way that avoids losses that can arise when capacitors are connected together.

36 Claims, 9 Drawing Sheets

(56) References Cited

U.S. PATENT DOCUMENTS

2021/0067041 A1* 3/2021 Cho .................. H02M 3/156
2023/0238887 A1* 7/2023 Lim .................. H02M 1/0095
363/60

* cited by examiner

SUPPRESSION OF REBALANCING CURRENTS IN A SWITCHED-CAPACITOR NETWORK

RELATED APPLICATIONS

The present application is a national stage entry of PCT Application Serial No. 2020/053336 filed Sep. 29, 2020, which is a continuation of U.S. patent application Ser. No. 16/588,060 filed on Sep. 30, 2019, entitled "Suppression of Rebalancing Currents in a Switched-Capacitor Network", and now issued as U.S. Pat. No. 10,924,006, the contents of which are herein incorporated by reference in their entirety.

FIELD OF INVENTION

The invention relates to power converters, and in particular, to switched-capacitor networks within power converters.

BACKGROUND

Modern electronic devices often have different components that require electricity to operate. These components are fastidious in their requirements. As such, it is important to supply each component with a stable source of electricity.

A difficulty that arises is that the ultimate source of electricity in many such devices is a battery. The voltage supplied by a battery is not constant. As the battery discharges, this voltage begins to dwindle. Changes in temperature can cause a resurgence in this voltage. Changes in load likewise cause changes in the battery's output voltage.

An additional difficulty exists even if a stable battery voltage could be assured. Different components have different power demands. For example, the display on a smart phone typically demands a higher voltage than the processor. Since the battery can only supply one voltage, some way must be found to appease the differing demands of the different components within the device.

To assist in keeping the various components supplied with a stable source of voltage, most such devices feature a power converter that stands between the battery and the various components. The function of the power converter is to take what the battery can offer and transform it into a form that is suitable for the various components that make up the device.

Known power converters use switched-capacitor networks in connection with carrying out their functions. A difficulty with such networks is that, in the course of their operation, charge moves from one capacitor to the other. This movement causes heating, which results in lost energy.

SUMMARY

In one aspect, the invention features a power converter that includes a switching network and a controller that controls the switching network. The controller to cause the switching network to form a switched-capacitor circuit that, during the course of operation, comprises a first path and a second path. The first path extends through a first capacitor network that comprises a plurality of pump capacitors and the second path extends through a second capacitor network that comprises the same plurality of pump capacitors. The first path connects to an anode and a cathode of a first pump-capacitor from the plurality of pump capacitors. The second path connects to the anode and a cathode of the first pump-capacitor and to an anode and a cathode of a second pump-capacitor from the plurality of pump capacitors. The anode of the first pump capacitor connects to the anode of the second pump capacitor. The controller is configured such that, when the anode of the first pump capacitor connects to the anode of the second pump capacitor upon formation of the second capacitor network, a voltage difference between the anodes is zero.

In some embodiments, the first path and the second path have different numbers of pump capacitors.

In other embodiments, the first path and the second path have the same capacitance.

In yet other embodiments, the controller is configured to cause the switching network to form a switched-capacitor circuit that further comprises a third path. The third path, which is formed in the first capacitor network has the same capacitance as the first path.

Also among the embodiments are those in which the controller is a controller to cause the switching network to form a switched-capacitor circuit that further comprises a third path, which is formed in the first capacitor network. The first, second, and third paths all have the same capacitance.

Other embodiments include those in which the first path comprises both a balancing capacitor and the first pump capacitor. Among these are embodiments in which the second path comprises only pump capacitors and no balancing capacitor and wherein the first and second paths have the same capacitance, those in which the balancing capacitor and the first pump capacitor have the same capacitance, those in which the balancing capacitor stores charge on a first area, the first pump capacitor stores charge on a second area, and the second area exceeds the first area, those in which the balancing capacitor stores charge on first and second areas separated by a first gap and the first pump capacitor stores charge on first and second areas separated by a second gap, with the second gap exceeding the first gap.

Also among the embodiments in which the first path comprises both a balancing capacitor and the first pump capacitor are those in which the switching network comprises a balancing switch that connects the balancing capacitor to the first pump capacitor, those in which the balance capacitor increases an extent to which the power converter operates adiabatically relative to an extent to which the power converter would operate adiabatically in the absence of the balance capacitor, and those in which the balance capacitor reduces an extent to which rebalancing current exists in the power converter relative to an extent to which the rebalancing current would exist in the absence of the balance capacitor.

In other embodiments, the first and second capacitor networks, each of which comprises balancing capacitors, cooperate to transform a first voltage into a second voltage. In these embodiments, the first and second capacitor networks would continue to transform the first voltage into the second voltage even if the balancing capacitors were to be omitted.

In yet other embodiments, the capacitors in the plurality of pump capacitors are all charge balanced.

Also among the embodiments are those in which the switched-capacitor circuit connects to one or more regulators.

In some embodiments, the first and second capacitor networks together define a cascade multiplier.

In other embodiments, the switching network comprises stack switches, phase switches, and balance switches, wherein the balance switches are smaller than the stack switches.

In yet other embodiments, the plurality of pump capacitors comprises a pump capacitor is to be rebalanced, the switched-capacitor circuit comprises a balancing capacitor, and the switches of the switching network comprise a switch configured to disconnect the balancing capacitor from the pump capacitor that is to be balanced.

In another embodiment, a power converter, includes a switching network and a controller that controls the switching network. The is configured to cause the switching network to form a capacitor network. The capacitor network comprises first and second paths, each of which has at least one pump capacitor. As a result of the at least one pump capacitor, the first and second paths have corresponding first and second capacitances. The first path also includes a rebalancing capacitor. As a result of the rebalancing capacitor and the at least one pump capacitor, the first path has a third capacitance. The magnitude of the difference between the first and second capacitances is greater than the magnitude of the difference between the third and second capacitances. The rebalancing capacitor thus has the effect of reducing charge redistribution between the two paths and therefore reduces losses from the resulting current that redistributes the charge.

As used herein, a controller "configured to cause" a condition is to be considered as meaning the same thing as a controller that is "adapted to cause" that condition and also a controller "that causes" that condition. In all cases, all of the foregoing terms cover the controller whether or not it is actually in operation. Notice is hereby given that any person who construes the claim as requiring that the apparatus actually be in operation for the claims to cover that apparatus is a person who has made an error in construing the claims by failing to construe the claims in light of the specification.

DETAILED DESCRIPTION

Figure 1:
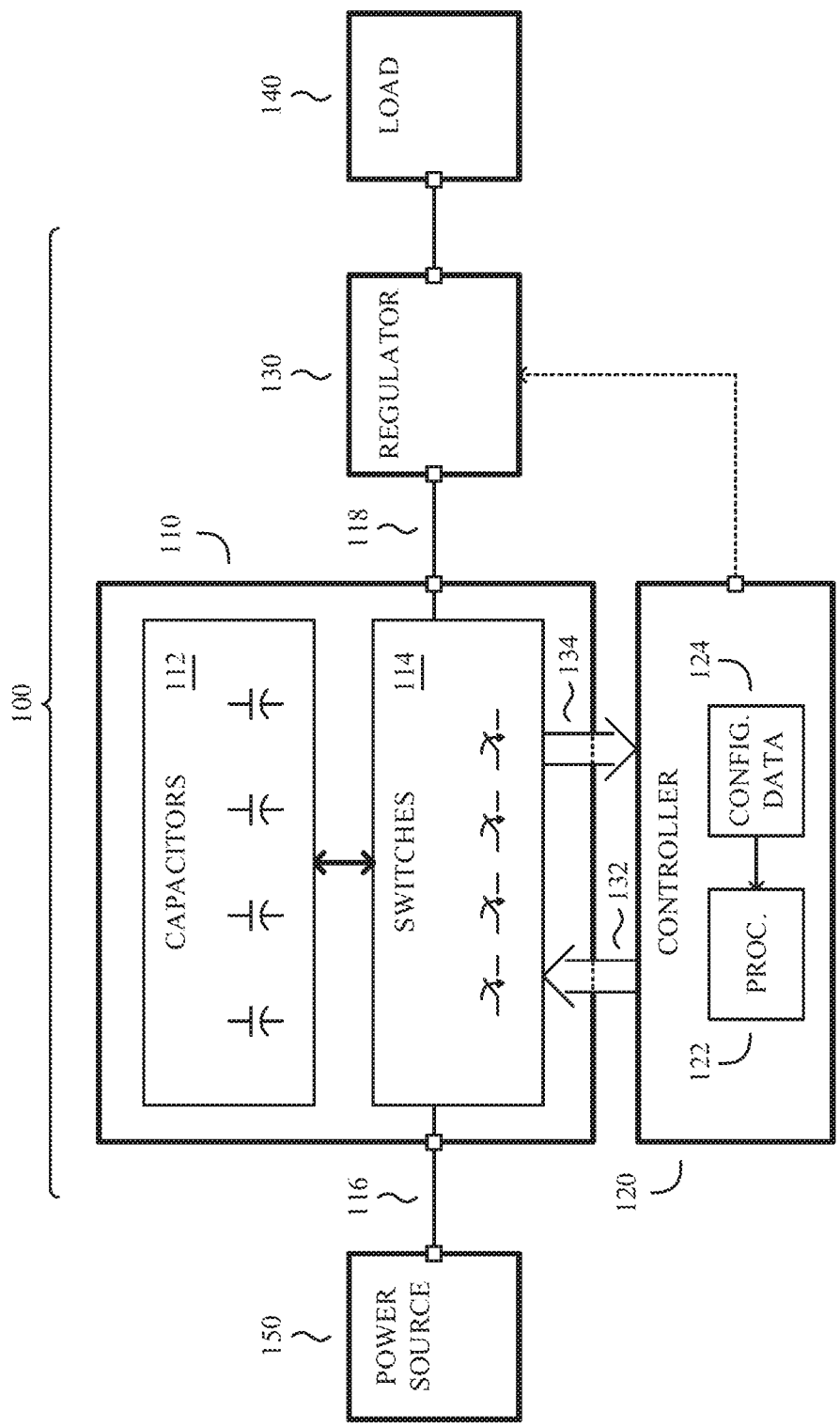
FIG. 1 shows a power converter with a regulator connected to load.
Figure 2:
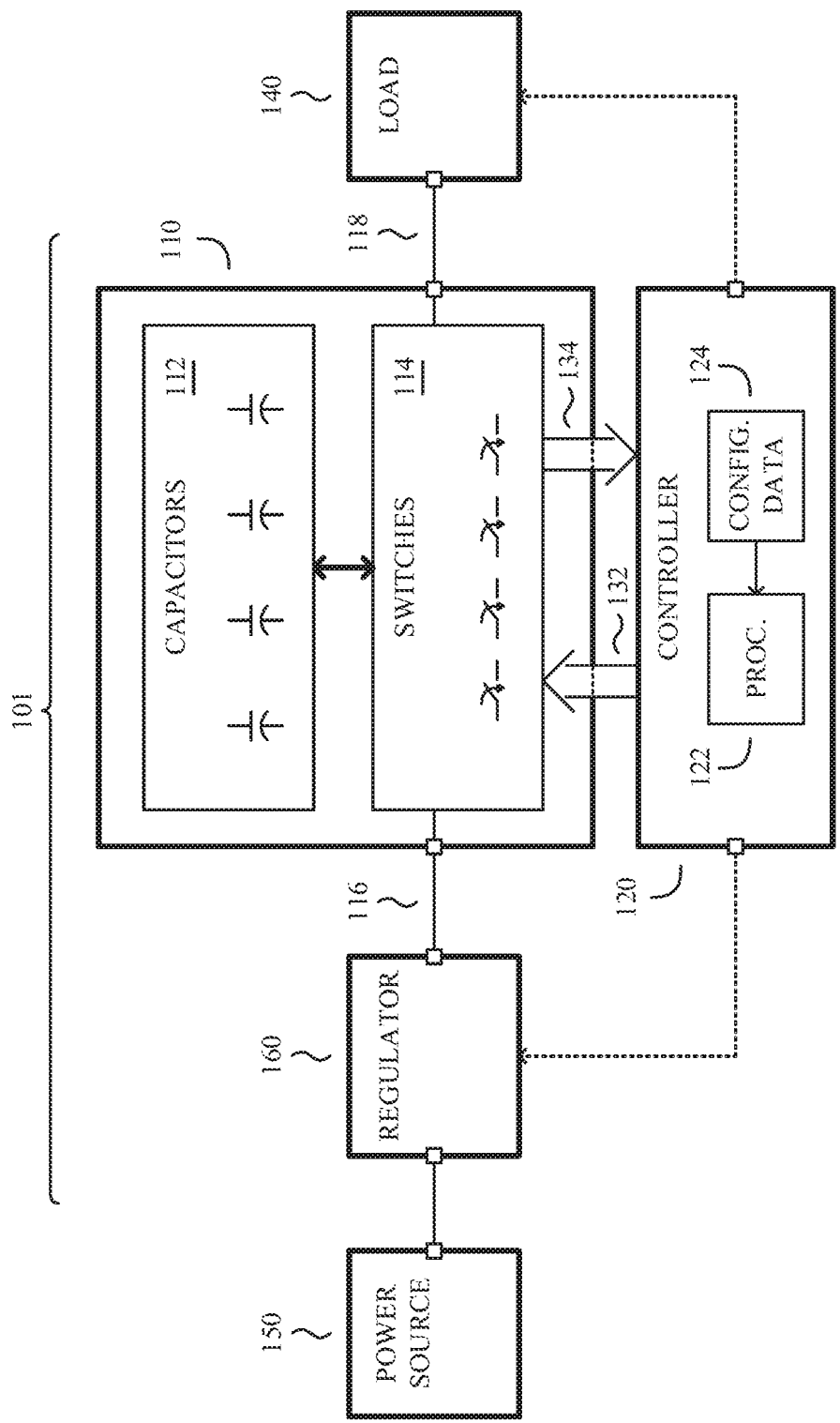
FIG. 2 shows a power converter with a regulator connected to a voltage source.
Figure 3:
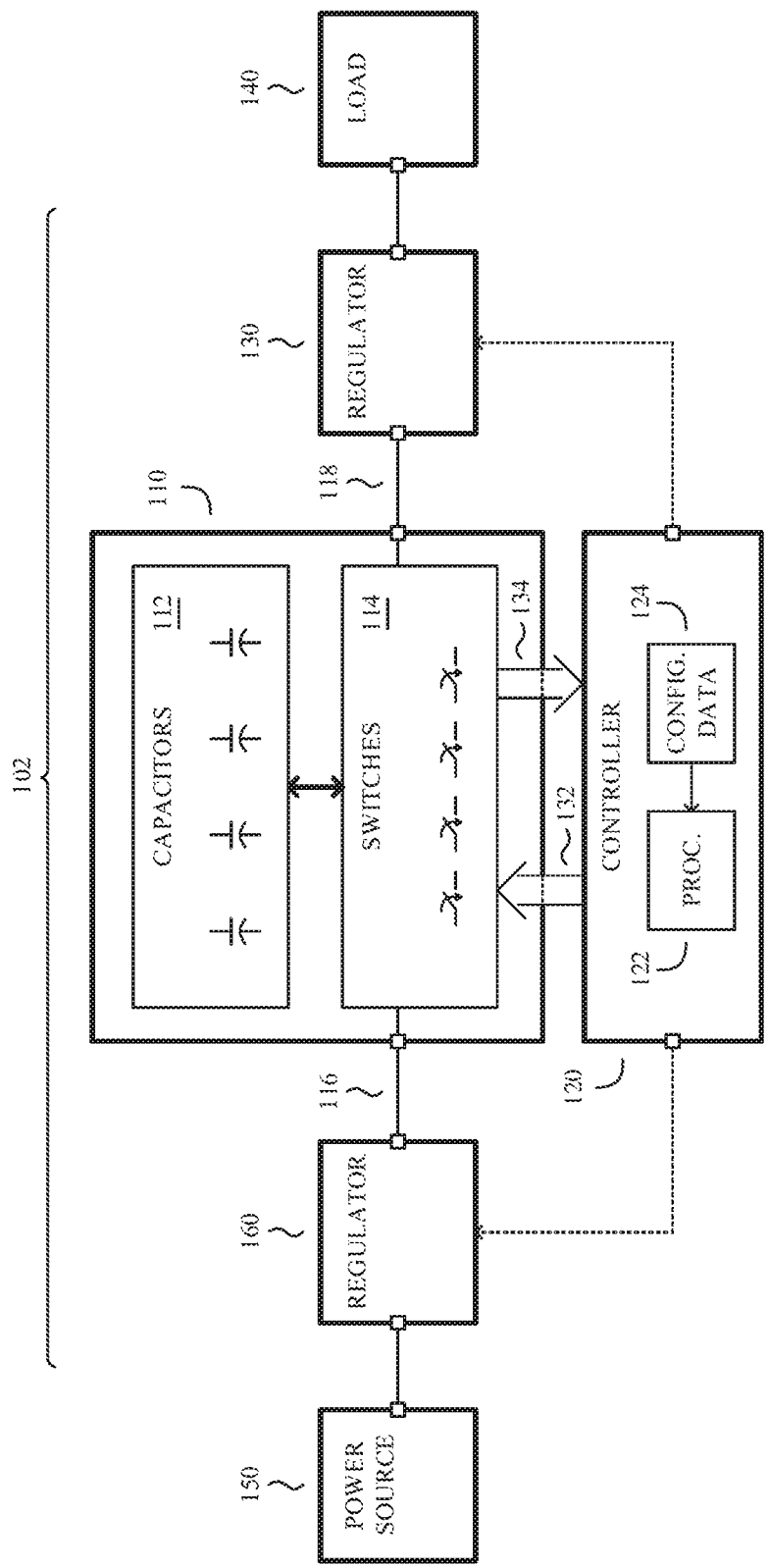
FIG. 3 shows a power converter with regulators connected to both the source and the load.

FIGS. 1-3 shows first, second, and third power converters 100, 101, 102 each of which has a switched-capacitor circuit 110. Each switched-capacitor circuit 110 includes a capacitor set 112 and a switching network 114 that uses the capacitor set 112 to form different capacitor networks at different times. The process of dynamically forming these capacitor networks causes charge to be transferred between capacitors. This transfer of charge ultimately causes the switched-capacitor circuit 110 to convert a first voltage, which is presented at the switch-capacitor circuit's first terminal 116, into a second voltage, which is made available at the switch-capacitor circuit's second terminal 118.

Power converters of the type shown in FIG. 1 are described in detail in U.S. Pat. Nos. 8,860,396, 8,743,553, 8,723,491, 8,503,203, 8,693,224, 8,724,353, 8,619,445, 9,203,299, 9,742,266, 9,041,459, U.S. Publication No. 2017/0085172, U.S. Pat. Nos. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318, the contents of which are all incorporated herein by reference.

A variety of different topologies can be used within the switched-capacitor circuit 110. These include Ladder, Dickson, Series-Parallel, Fibonacci, cascade multipliers, and Doubler topologies.

The voltage at the switch-capacitor circuit's second terminal 118 is equal to the product of the voltage at its first terminal 116 and a voltage-conversion factor. The voltage-conversion factor is a number from a set that is formed by a union of a first set and a second set. The first set is the set of all positive integers. The second set is the set reciprocals of the integers in the first set. When the voltage-conversion factor belongs to the first set, the power converter 100 is said to be a "step-up" power converter. When the voltage-conversion factor belongs to the second set, the power converter 100 is said to be a "step-down" power converter.

A controller 120 provides control signals to control operation of the switching network 114. To carry out these functions, the controller 120 relies on a programmable processor 122 and configuration data 124 and/or processor instructions that, when executed, cause the controller 120 to carry out its mission.

Other embodiments include those in which the controller 120 relies on logic circuitry and those in which it relies on analog circuitry to control operation of the switching network 114.

Because the voltage-conversion factor of the switched-capacitor circuit 110 is selected from a set of discrete values, there will be many voltages that the switched-capacitor circuit 110 is unable to provide. The operating range of such a converter would therefore have many large gaps. A power converter that relies only on a switched-capacitor circuit 110 will therefore be unable to efficiently provide voltages that fall within these gaps. For this reason, it is useful to also provide a regulator.

Like a switched-capacitor circuit 110, a regulator converts an input voltage into an output voltage. However, unlike a switched-capacitor circuit 110, a regulator can, in principle, output any voltage within a continuous operating range of voltages. This differs from the switched-capacitor circuit 110, which can only efficiently output a voltage defined by a discrete set of voltage-conversion factors. A regulator is thus useful to be able to fill in these gaps In the case of the first power-converter 100, a load-side regulator 130 connects the charge pump's second terminal 118 to a load 140. The charge pump's first terminal 116 connects to a power source 150. It is this power source 150 that supplies the power that is to be converted by the power converter 100 in response to control signals provided by the controller 120 on a control path 132.

To assist it in deciding what control signals are to be placed on the control path 132, the controller 120 also receives sensor signals via a sensor path 134. These sensor signals provide information on how the switched-capacitor circuit 110 is operating. The sensor path 134 thus permits the controller 120 to carry out feedback control.

In the case of the second power-converter 101, a supply-side regulator 160 connects the charge pump's first terminal 116 to the power source 150. The third power-converter 102 includes both the load-side regulator 130 and the source-side regulator 160.

In some embodiments, the regulator 130, 160 is a switched-inductor circuit. Examples include a buck converter, a boost converter, a buck-boost converter, whether non-inverting or otherwise, a Cuk converter, a SEPIC converter, resonant converter, a multi-level converter, a flyback converter, a forward converter, and a full-bridge converter. In such embodiments, the controller 120 also provides control signals for controlling the regulator's switch.

In other embodiments, the regulator 130, 160 is a passive regulator. An example of a passive regulator is an inductor. Another example of a passive regulator is an LC tank. Such embodiments dispense with the need to control a switch within the regulator 130, 160.

A regulator 130, 160, whether active or passive, generally includes an inductor. At the frequencies of interest, the inductor behaves like an ideal current-source. For this reason, some of the figures use an ideal current source IOUT to represent the regulator 130, 160. Although the current source IOUT will be shown with an arrow in a particular direction to represent current, this is not intended to imply the value of the current. Thus, the current can be either positive or negative in value. As such, the ideal current source IOUT can be viewed as sourcing or sinking current depending on the activity of the switched-capacitor circuit 110 to which the regulator 130, 160 connects.

Figure 4:
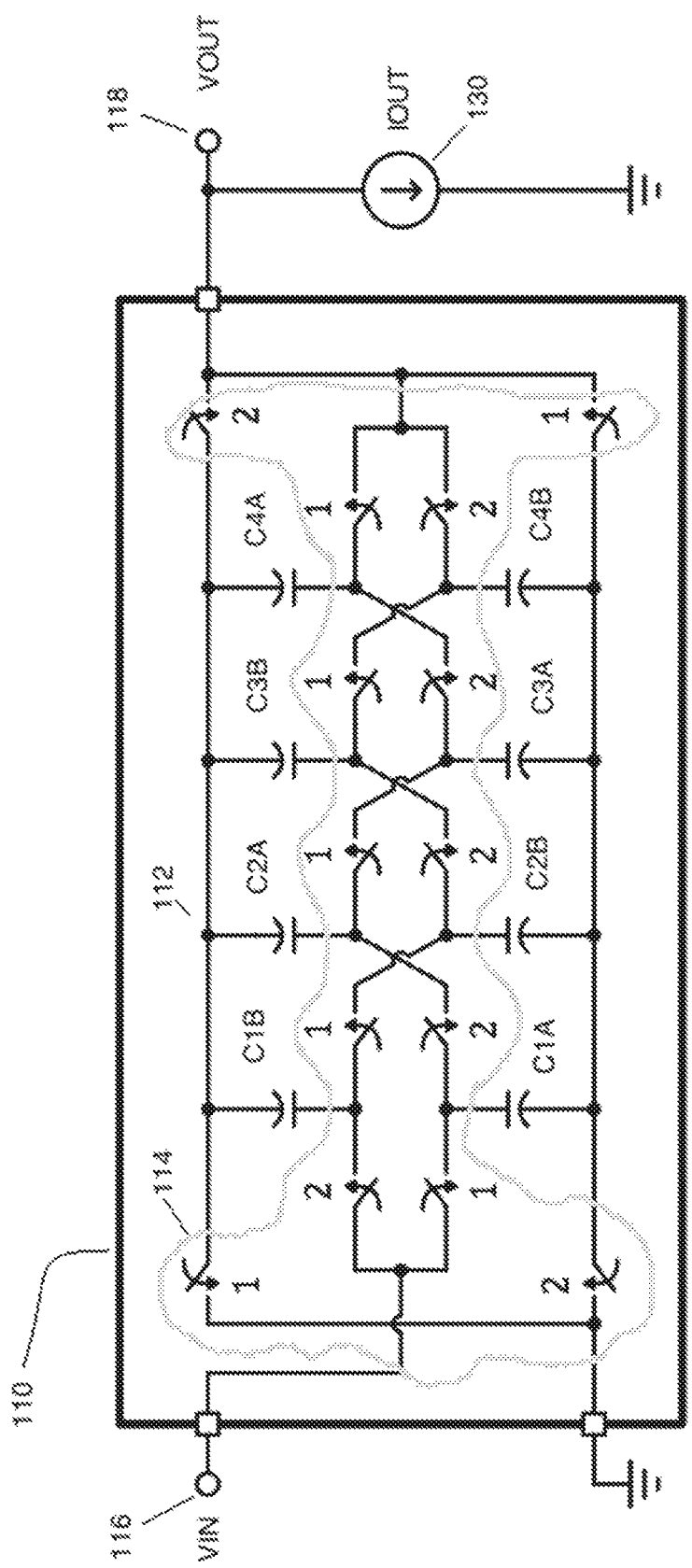
FIG. 4 shows details of a switched-capacitor circuit from FIG. 1.

FIG. 4 shows details of a particular switched-capacitor circuit 110 that receives an input voltage VIN at its first terminal 116 and that provides an output voltage VOUT at its second terminal 118. The illustrated switched-capacitor circuit 110 is a two-phase cascade multiplier having a voltage-conversion factor of ⅕. As a result, the output voltage VOUT is one-fifth of the input voltage VIN. An ideal current source IOUT represents the load-side regulator 130.

The capacitor set 112 includes first, second, third and fourth outer pump-capacitors C1A, C1B, C4A, C4B, and first, second, third, and fourth inner pump-capacitors C2A, C2B, C3A, C4B. It is these pump capacitors that participate in voltage transformation.

The switching network 114 include stack switches and phase switches.

The stack switches connect anodes of the pump capacitors C1A, C1B, C4A, C4B, C2A, C2B, C3A, C4B either to anodes of adjacent pump capacitors or to one of the two terminals 116, 118 of the switched-capacitor circuit 110. There are ten such stack switches in the illustrated circuit.

The phase switches connect the cathodes of the pump capacitors C1A, C1B, C4A, C4B, C2A, C2B, C3A, C4B either to ground or to the output terminal 118 of the switched-capacitor circuit 110. in the illustrated switching network 114, there are four such phase switches.

Figure 5:
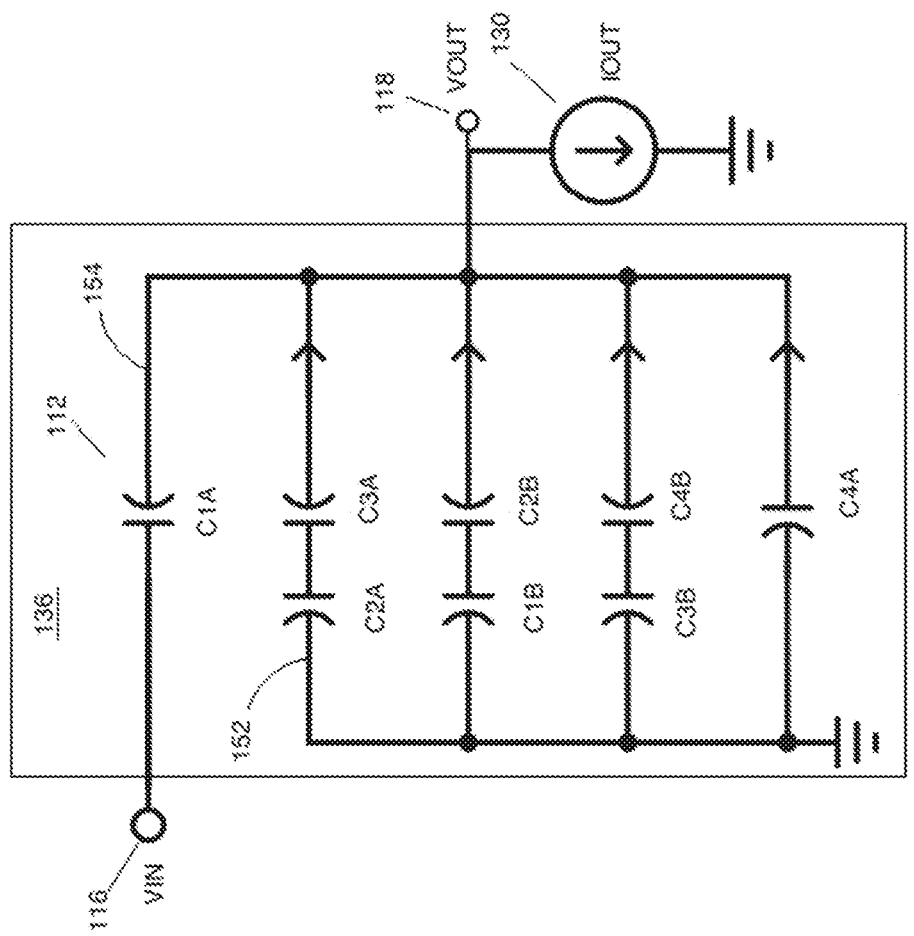
FIGS. 5 and 6 show two networks formed by different configurations of switches in the switched-capacitor circuit shown in FIG. 4.
Figure 6:
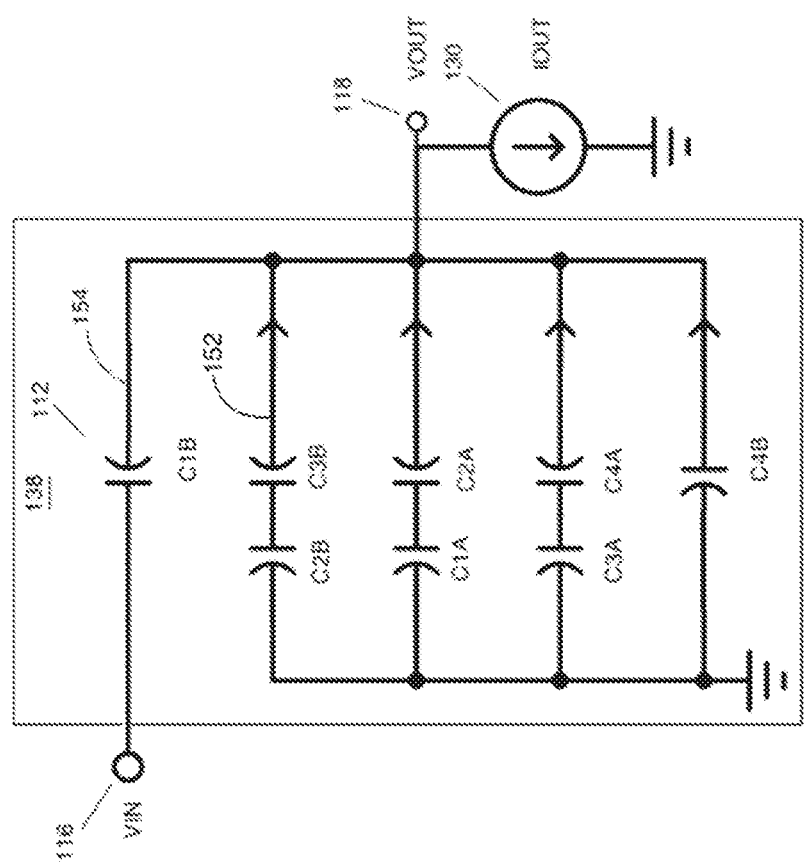

The stack switches and phase switches divide into first and second switch groups 1, 2 that operate together as a unit. The controller 20 causes switches in the first switch group 1 open and close together and the switches in the second switch group 2 open and close together. In doing so, the controller 20 causes the switching network 114 to interconnect the capacitors from the capacitor set 112 to first form a first capacitor network 136 and to later use the same capacitors to form a second capacitor network 138 as shown in FIGS. 5 and 6.

Based on the configuration of the switching network 114, the switched-capacitor circuit 110 transitions between first, second, and third states to complete one cycle of operation.

In the switched-capacitor circuit's first state, all switches in the first switch set 1 are open and all switches in the second switch set 2 are closed. This forms a first capacitor-network 136, as shown in FIG. 5.

In the switched-capacitor circuit's second state, all switches in the first switch set 1 are closed and all switches in the second switch set 2 are open. This forms a second capacitor-network 138, as shown in FIG. 6.

In the switched-capacitor circuit's third state, all switches in both the first and second switch sets 1, 2 are open. The third state does not form any network because all the switches are open.

The desirability of the third state arises because it is important to make sure that switches in the first and second switch sets 1, 2 are never in a closed state at the same time. Since these switches are implemented using transistors, it is necessary to account for the fact that one cannot control precisely when a transistor will actually transition between conducting and non-conducting states. By having a third state in which all switches are open, it is possible to reduce the probability of having switches from the first and second switch sets 1, 2 closed at the same time.

In one cycle of operation, the controller 120 opens and closes switches in the switching network 114 to cause the switched-capacitor circuit 110 to transition from the first state to the third state, from the third state to the second state, from the second state to the third state, and then from the third state back to the first state. As a result, every transition between the first and second states has an intervening third state. The time spent in this third state is the "dead time." To omit unnecessary complexity, it will be assumed in further discussion that the switched-capacitor circuit 110 transitions directly between its first and seconds states.

Each of the first and second capacitor networks 136, 138 formed during the first and second states has a plurality of charge-transfer paths 152, 154, referred to herein as simply "paths." Each of these paths 152, 154 carries a current that ultimately contributes to the output current IOUT. The particular embodiment shown includes low-capacitance paths 152 and high-capacitance paths 154. The first and fifth paths are high-capacitance paths 152. The remaining paths are low-capacitance paths 154. As a result, the currents through these paths 152, 154 are not the same.

During the first state, at least one of the capacitors shown will accumulate a first amount of charge. During the second state, that capacitor will lose a second amount of charge that it previously accumulated. If the first and second amounts are the same, the capacitor is said to be "charge-balanced." Otherwise, the capacitor is said to be "charge-imbalanced."

If one compares FIGS. 5 and 6, it becomes apparent that a capacitor that spends the first state in the high-capacitance path 154 may find itself spending the second state in a low-capacitance path 152.

For example, as shown in FIGS. 5 and 6, the first outer pump-capacitor C1A spends the first state in a high-capacitance path 154 and spends the second state in a low-capacitance path 152. Therefore, the first outer pump-capacitor C1A will have different charging and discharging currents. As a result, the first outer pump-capacitor C1A will tend to become unbalanced.

A capacitor that becomes imbalanced during one state has the opportunity to correct this in the next state. However, this comes at a cost of efficiency. To see why, it is useful to consider the interaction between capacitors.

For example, suppose that, at the end of a first state, a first capacitor has become imbalanced. In the second state, it is possible for a switch to connect the first capacitor's anode to a second capacitor's anode. If the two anodes are at different voltages, a rebalancing current will flow through the switch between the first and second capacitors.

Although this procedure will correct the imbalance, it comes at a cost. Because the two anodes would effectively be shorted together, this rebalancing current can be quite large. This leads to large ohmic loss. The ohmic loss that arises from rebalancing or redistribution of charge will be referred to herein as "redistribution loss."

This can be seen in FIG. 6, in which the first outer pump-capacitor C1A finds its anode shorted to the anode of the first inner pump capacitor C2A. To the extent there is a voltage difference between the two anodes involved, a large rebalancing current will flow between them.

One way to suppress rebalancing current is to ensure that any two anodes that are to be connected together already have the same voltage when it comes time to connect them together. This ensures that when the two anodes are connected, no rebalancing current flows between them.

For example, in the case of FIG. 6, if the first outer pump-capacitor's anode is at the same voltage as the first inner pump capacitor's anode, then connecting the two anodes will not trigger flow of rebalancing current.

Figure 7:
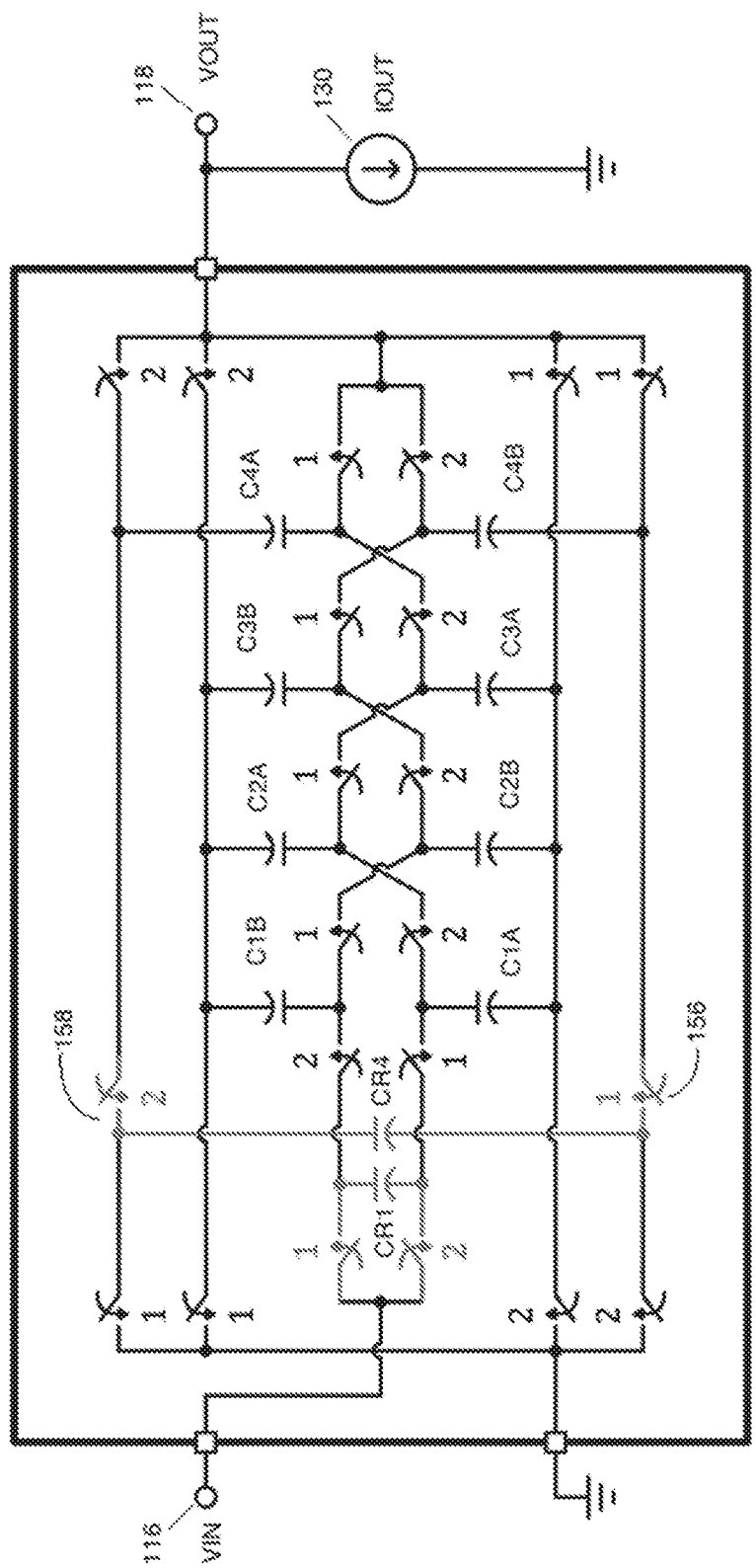
FIG. 7 shows details of a switched-capacitor circuit similar to that shown in FIG. 4 but with the addition of balancing capacitors.

The amount of charge that enters or leaves any capacitor during a particular state is the integral of the current over the course of that state. Thus, in order to ensure that a capacitor gains and loses equal amounts of charge during the course of a cycle, it is important that the integral of the current for that capacitor be the same during both the first and second time intervals. FIG. 7 shows a switched-capacitor circuit 110 similar to that shown in FIG. 5 but having been modified to achieve just this condition, thereby reducing the risk of charge imbalance among the capacitors.

As shown in FIG. 7, the capacitor set 112 includes two different kinds of capacitors. As was the case in FIG. 5, the capacitor set 112 includes first, second, third and fourth outer pump-capacitors C1A, C1B, C4A, C4B, and first, second, third, and fourth inner pump-capacitors C2A, C2B, C3A, C3B. However, the capacitor set 112 also includes first and second balancing capacitors CR1, CR4.

The capacitances of these first and second balancing capacitors CR1, CR4 are chosen such that all paths 152, 154 in the first and second states will have the same capacitance. In the case in which all pump capacitors C1A, C1B, C4A, C4B, C2A, C2B, C3A, C4B have the same capacitance, the first and second balancing capacitors CR1, CR4 will have the same capacitance as the pump capacitors C1A, C1B, C4A, C4B, C2A, C2B, C3A, C4B.

In addition to the ten stack switches and the four phase switches, the switching network 114 also includes first and second balancing switches 156, 158. The first balancing switch 156 is part of the first switch set 1. The second balancing switch 158 is part of the second set 2.

Figure 8:
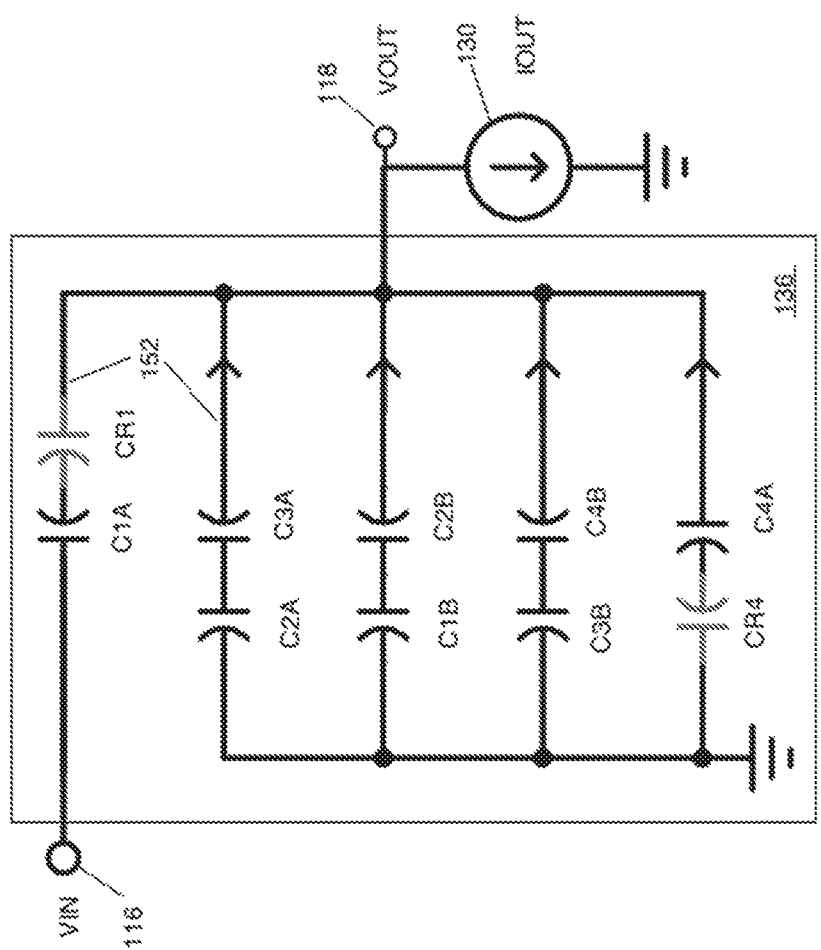
FIGS. 8 and 9 show two networks formed by different configurations of switches in the switched-capacitor circuit shown in FIG. 7.
Figure 9:
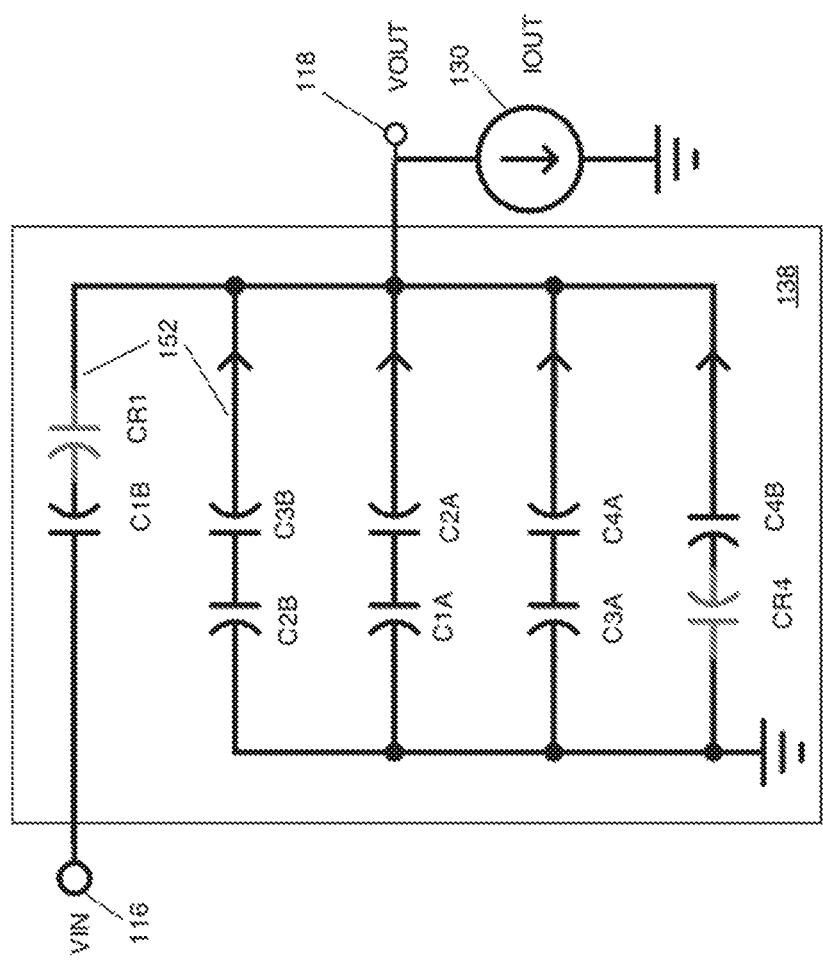

The presence of the balancing capacitors CR1, CR4 results in first and second capacitor-networks 136, 138 shown in FIGS. 8 and 9.

As was the case in FIGS. 5 and 6, the first and second capacitor networks 136, 138 features multiple paths. However, unlike those capacitor networks, which featured a mix of high and low capacitance paths 154, 152, the first and second capacitor networks 136, 138 shown in FIGS. 7 and 8 only have high capacitance paths 154. This reduces the possibility of connecting two anodes of unequal voltage and thus reduces the likelihood of rebalancing loss.

The balancing capacitors CR1, CR2 do not participate in voltage transformation. As such, they are not required to store copious quantities of charge. Their only role is to provide a balancing capacitance. This frees them from design constraints associated with the pump capacitors C1A, C1B, C4A, C4B, C2A, C2B, C3A, C4B.

For a given inter-plate permittivity, the capacitance of a parallel-plate capacitor depends on the area of the plates and the separation between them. Thus, one can arrive at a large capacitance by having large plates that are far from each other or small plates that are close together.

If the plates are large, they will consume a great deal of area on an integrated circuit. Since the cost to manufacture a circuit depends on its overall area, having large plates results in a costlier circuit.

On the other hand, if the plates are made smaller and the inter-plate separation is also made smaller to achieve the same capacitance, then, for a given amount of charge stored on the plate, the surface charge density will be greater. As a result, the electric field between the plates will become more intense. This high electric field, together with the smaller gap between the plates, creates the risk of dielectric breakdown and arcing across the dielectric.

The pump capacitors 112 are intended to store large amounts of charge and to also sustain a high dc bias voltage. As such, they are typically quite large so that the stored charge can be spread out over a larger area. In fact, in some implementations, the pump capacitors 112 are large enough so that it is more practical to provide them as lumped circuit elements rather than as being part of an integrated circuit.

However, this is not true of the balancing capacitors CR1, CR4. These are only present to provide a value of capacitance. In operation, they store only a token amount of charge. The balancing capacitors CR1, CR4 also do not have to sustain a dc bias. As such, the balancing capacitors CR1, CR4 can be made quite small. This means that they will not significantly increase the cost of manufacturing the circuit.

In operation, an open stack switch often has a high voltage across its terminals. Thus, it must block current from flowing even when a high voltage urges that current to flow. This requires certain design compromises that result in a physically large switch that consumes considerable area on an integrated circuit.

The balancing switches 156, 158 avoid these design compromises. In operation, a balancing switch 156, 158 will only have a low voltage ripple across its terminals. This means that the balancing switches 156, 158 can be made physically smaller than the stack switches 114.

In general, to promote efficient power conversion, it is useful for the power converter 100, 101, 102 to pass as much current as possible through an inductor. Since an inductor tends to resist change in current, this suppresses current transients that contribute to loss. In a 100% adiabatic power converter 100, 101, 102, all current will flow through an inductor.

The rebalancing current flows directly between pump capacitors. As such, it does not flow through an inductor. To the extent rebalancing current exists, it reduces the extent to which a power converter 100, 101, 102 is adiabatic. The suppression of rebalancing current through the use of balancing capacitors CR1, CR4 thus promotes adiabatic operation of the power converter 100, 101, 102 as a whole.

Having described the invention, and a preferred embodiment thereof, what is claimed as new and secured by Letters Patent is:

The invention claimed is:
1. A power converter, comprising:
a capacitor network comprising a path; and
a controller to transition the capacitor network between a first state and a second state, wherein the first state and the second state occur substantially directly after one another;
wherein the path comprises a fly capacitor and a rebalancing capacitor, the fly capacitor configured in the absence of the rebalancing capacitor to be charge-imbalanced with respect to the capacitor network transitioning between the first state and the second state;
wherein the fly capacitor is configured in the presence of the rebalancing capacitor to be charge-balanced with respect to the capacitor network transitioning between the first state and the second state such that a capacitance of the rebalancing capacitor is substantially equal to a capacitance of the fly capacitor.
2. The power converter of claim 1, wherein as a result of the rebalancing capacitor, a capacitance associated with the path is altered.
3. The power converter of claim 1, wherein the rebalancing capacitor is configured to increase adiabatic operation of the power converter.
4. The power converter of claim 1, wherein the rebalancing capacitor is configured to reduce rebalancing current in the power converter.
5. The power converter of claim 1, wherein the controller is to transform a first voltage into a second voltage.
6. The power converter of claim 1, wherein the controller is connected to a regulator.
7. The power converter of claim 1, wherein the controller is connected to a first regulator and a second regulator.
8. The power converter of claim 1, wherein the capacitor network comprises a cascade multiplier.
9. The power converter of claim 1, wherein the capacitor network comprises stack switches, phase switches, and balance switches.
10. The power converter of claim 1, further comprising:
a switching network,
wherein the controller causes the switching network to form a switched-capacitor circuit that comprises the capacitor network.
11. The power converter of claim 10, wherein the switching network comprises a balancing switch that connects the rebalancing capacitor to the fly capacitor.
12. The power converter of claim 10, wherein the controller causes conversion of a first voltage at a first terminal of the switched-capacitor circuit to a second voltage at a second terminal of the switched-capacitor circuit.
13. The power converter of claim 12, wherein the first terminal of the switched-capacitor circuit is connected to a power source that supplies power in response to control signals provided by the controller.
14. The power converter of claim 1, wherein the first state and the second state occurring substantially directly after one another includes a dead time between the first and the second state.
15. A power converter, comprising:
a capacitor network configured to transition between a first state and a second state;
wherein the capacitor network includes a rebalancing capacitor, wherein the rebalancing capacitor is configured to reduce a redistribution loss associated with the capacitor network transitioning between the first state and the second state,
wherein in the first state, a first pump capacitor is connected to a rebalancing capacitor, a capacitance of the first pump capacitor being substantially equal to a capacitance of the rebalancing capacitor, and
wherein in the second state, a second pump capacitor is connected to a third pump capacitor.
16. The power converter of claim 15, wherein the first pump capacitor is associated with the redistribution loss.
17. The power converter of claim 15, wherein the second pump capacitor is associated with the redistribution loss.
18. The power converter of claim 15, wherein the third pump capacitor is associated with the redistribution loss.
19. The power converter of claim 15, wherein the rebalancing capacitor increases adiabatic operation of the power converter.
20. The power converter of claim 15, wherein the rebalancing capacitor reduces rebalancing current in the power converter.
21. The power converter of claim 15, wherein the capacitor network is to transform a first voltage into a second voltage.
22. The power converter of claim 15, wherein the capacitor network connects to a regulator.
23. The power converter of claim 15, wherein the capacitor network connects to a first regulator and a second regulator.
24. The power converter of claim 15, wherein the capacitor network comprises a cascade multiplier.
25. The power converter of claim 15, wherein the capacitor network comprises stack switches, phase switches, and balance switches.
26. The power converter of claim 15, further comprising:
a switching network; and
a controller,
wherein the controller causes the switching network to form a switched-capacitor circuit that comprises the capacitor network.
27. The power converter of claim 26, wherein the switching network comprises a balancing switch that connects the rebalancing capacitor to the first pump capacitor.
28. The power converter of claim 26, wherein the controller causes conversion of a first voltage at a first terminal of the switched-capacitor circuit to a second voltage at a second terminal of the switched-capacitor circuit.
29. The power converter of claim 28, wherein the first terminal of the switched-capacitor circuit is connected to a power source that supplies power in response to control signals provided by the controller.
30. A power converter, comprising:
a capacitor network; and
a controller that controls the capacitor network,
wherein:
the capacitor network comprises a first path and a second path, wherein the first path comprises a first fly capacitor and a second fly capacitor in series and the second path comprises a third fly capacitor and a rebalancing capacitor in series, the rebalancing capacitor being selectively coupled to the third fly capacitor via a plurality of switches.
31. The converter of claim 30, wherein the first fly capacitor, the second fly capacitor, and the third fly capacitor each comprise a DC voltage component and an AC voltage component.

32. The converter of claim 30, wherein the rebalancing capacitor comprises an AC voltage component.

33. The power converter of claim 30, further comprising:
a switching network,
wherein the controller causes the switching network to form a switched-capacitor circuit that comprises the capacitor network.

34. The power converter of claim 33, wherein the switching network comprises a balancing switch that connects the rebalancing capacitor to the third fly capacitor.

35. The power converter of claim 33, wherein the controller causes conversion of a first voltage at a first terminal of the switched-capacitor circuit to a second voltage at a second terminal of the switched-capacitor circuit.

36. The power converter of claim 35, wherein the first terminal of the switched-capacitor circuit is connected to a power source that supplies power in response to control signals provided by the controller.

* * * * *